(12) United States Patent (10) Patent No.: US 6,220,741 B1
Kawachi et al. (45) Date of Patent: Apr. 24, 2001

(54) FLAT PANEL DISPLAY DEVICE

(75) Inventors: Shin Kawachi; Kenji Satoh, both of Saitama-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/315,983

(22) Filed: May 21, 1999

(30) Foreign Application Priority Data

May 22, 1998 (JP) ................................................ 10-141216

(51) Int. Cl.[7] ....................................................... F21V 7/04
(52) U.S. Cl. .................. 362/561; 362/31; 362/26
(58) Field of Search .............................. 362/26, 31, 559, 362/561

(56) References Cited

U.S. PATENT DOCUMENTS

| | | | |
|---|---|---|---|
| 5,202,950 | * 4/1993 | Arego et al. | 362/561 |
| 5,485,354 | * 1/1996 | Ciupke et al. | 362/26 |
| 5,608,837 | * 3/1997 | Tai et al. | 362/559 |
| 5,844,773 | * 12/1998 | Malhi | 362/26 |
| 5,957,561 | * 9/1999 | Ono et al. | 362/31 |
| 5,961,198 | * 10/1999 | Hira et al. | 362/31 |
| 6,020,942 | * 2/2000 | Yun et al. | 361/681 |
| 6,040,811 | * 3/2000 | Malhi | 361/681 |

* cited by examiner

*Primary Examiner*—Sandra O'Shea
*Assistant Examiner*—Peggy Neils
(74) *Attorney, Agent, or Firm*—Pillsbury Winthrop LLP

(57) ABSTRACT

There is disclosed a flat panel display device which is thin in thickness, light in weight, and improved in durability. A liquid crystal display panel 30 and a surface light source unit 50 are held between a base enclosure 64 of a housing 22 and a surface cover member 60. The display panel 30 is connected to rotatable support members 26 which rotatably support the display panel 30. The surface light source unit 50 includes a tube-like light source 53, a reflector 54 and an inverter circuit 80 to drive the light source 53 which are disposed close to the support members 26 in the enclosure 64. The surface light source unit 50 further includes a light guide 52 which is gradually thinner in thickness from the side of the support member 26 to its opposite side. The enclosure 64 further includes a bottom plate 68 which is also gradually thinner in thickness from the side of the support member 26 to its opposite side.

9 Claims, 4 Drawing Sheets

FLAT PANEL DISPLAY DEVICE

BACKGROUND OF THE INVENTION

This invention relates to a flat panel display device and, more particularly, to a flat panel display device used in combination with various electronic equipment.

A flat panel display device, such as a liquid crystal display device, has been used in many applications because such a flat panel display device is advantageously thin in thickness, light in weight, and low in power consumption.

A light transmission type liquid crystal display device, for instance, is provided with a liquid crystal panel, a bezel, a frame, and a surface light source to illuminate the panel. The panel includes a pair of electrode substrates and a liquid crystal layer held between the substrates. The bezel is usually made of a sheet metal or other sufficiently strong materials while the frame is molded out of resins to effectively support the light source. The liquid crystal display device of this kind is built in a housing of electronic equipment, such as a portable personal computer, and handy terminal equipment.

In an attempt to make a flat panel display device thinner, recently a liquid crystal display panel has been directly built in a housing of electronic equipment. Such housing includes, for instance, a first housing unit with an opening corresponding to an effective display region of the liquid crystal panel and a second housing unit provided on the side of a surface light source. The first and second housing units are assembled to directly hold the liquid crystal display panel.

This structure is capable of making the electronic equipment incorporated with the flat panel display device much thinner as a whole because a conventional bezel is not necessary any longer.

However, it is likely to reduce the mechanical strength of the flat panel display device. Since the liquid crystal display panel is configured to pivot upon a reference axis of the electronic equipment, such a pivoting structure, in particular, may weaken the mechanical strength resulting in endurance reduction.

The flat panel display device is applied to a compact personal computer, for instance, with which the display device is assembled to be rotatable about a hinge of its main body. An operator often rotates the flat panel display device about the hinge. Thus, it is quite difficult to comply with requirements for the mechanical strength sufficiently.

SUMMARY OF THE INVENTION

One object of the present invention is to provide a flat panel display device which is thin in thickness, light in weight, and sufficient in mechanical strength.

In order to achieve the object, one aspect of a flat panel display device of the present invention includes a flat display panel, a circuit, a light source, a cover member, an enclosure, and a rotatable support member. The display panel has a display region provided with a plurality of pixels. The circuit supplies a driving signal to the flat display panel. The light source provided opposite to the flat display panel emits light toward the display panel. The cover member has a window corresponding to the display region. The enclosure receives the display panel, the circuit, and the light source and is assembled with the cover member. The rotatable support member is provided at one end portion of either the cover member or the enclosure and rotatably supports the cover member and the enclosure. Thus, the center of gravity with respect to the assembled first panel display device is closer to the support member than to another end portion of either the cover member or the enclosure.

According to one aspect of the present invention, the center of gravity is set by adjusting a disposition and thickness of the light source and a thickness of the enclosure.

According to one aspect of the present invention, the display panel and the light source are held between the cover member and the light source unit. Thus, the flat panel display device does not need either a conventional bezel or a conventional frame so that the display device is thin in thickness and light in weight. Further, the center of gravity of the display device is set on the side of the rotatable support member by the adjusting of the disposition and thickness of the light source unit and the thickness of the enclosure. Thus, the flat panel display device, when being exerted to rotate, is less in rotation torque and is improved in durability.

According to one aspect of the present invention, the light source unit includes a tube-like light source disposed at a location which is closer to the rotatable support member, a light guide to convert light emitted from the tube-like light source to surface light, a reflector to reflect the light emitted from the tube-like light source to the light guide, and an optical film provided opposite to the light guide to make brightness of the surface light substantially uniform. The tube-like light source is disposed close to the end portion of the support member.

According to one aspect of the present invention, the light source further includes a light source driving circuit provided close to the tube-like light source. The enclosure includes a plate which is gradually thinner in thickness from the one end portion of the enclosure to the opposite end portion thereof.

According to one aspect of the present invention, the display panel is provided opposite to the light guide which is gradually thinner in thickness along the one end portion of the enclosure to the opposite end portion thereof.

The above-stated and other objects and advantages of the invention will become apparent from the following description when taken with the accompanying drawings. It will be understood, however, that the drawings are for purposes of illustration and not to be construed as defining the scope of limits of the invention, reference being had for the latter purpose to the claims appended hereto.

DETAILED DESCRIPTION OF THE PREFERRED EMBODIMENT

Figure 1:
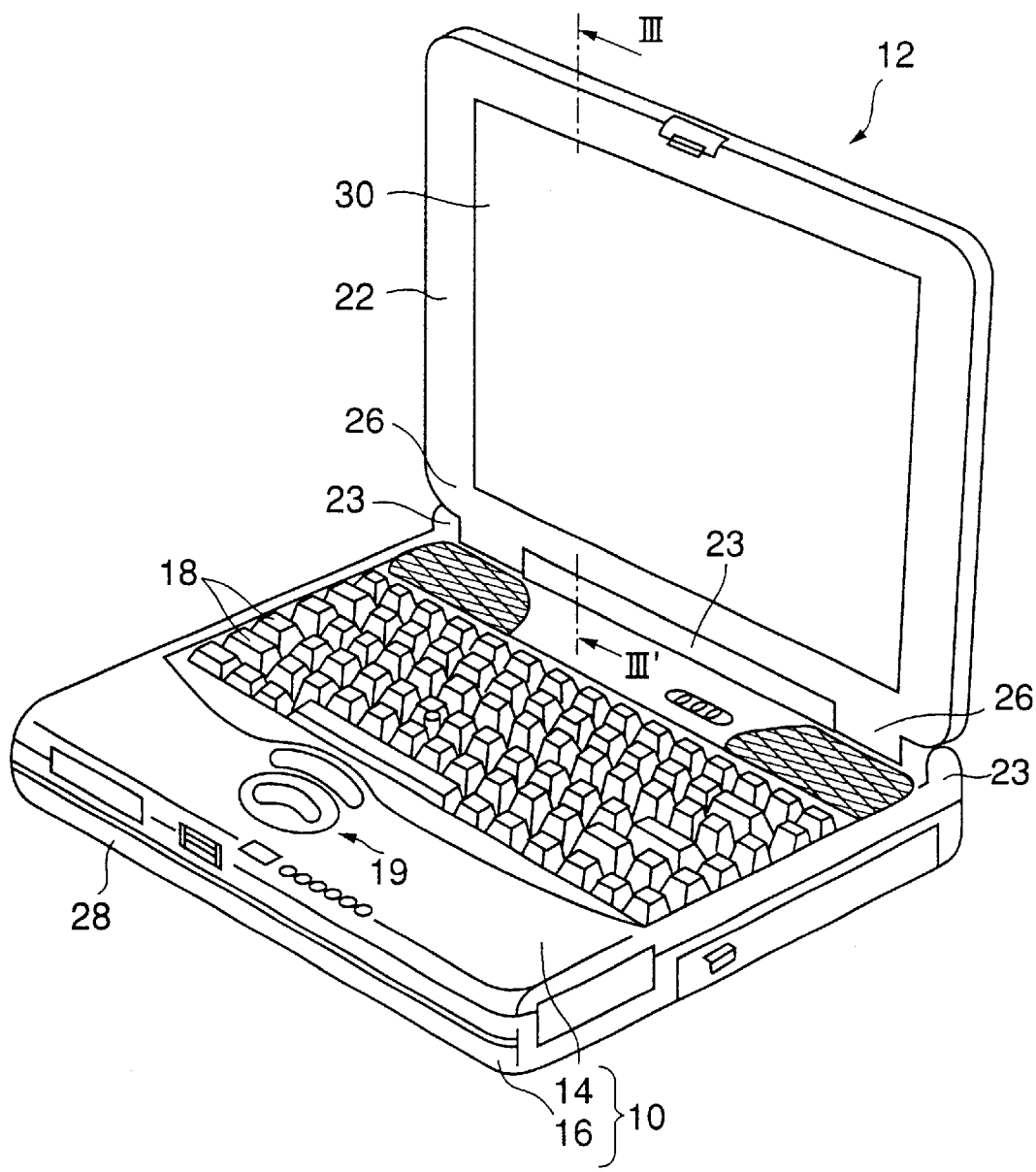
FIG. 1 is a side view of an embodiment of a personal computer to which a flat panel display device of the present invention is applied.

With reference to the drawings, a laptop type personal computer assembled with a flat panel display device will be explained hereinafter as an embodiment of the present invention. As shown in FIG. 1, the personal computer includes a flat rectangular main body 10 and a flat panel display unit 12 assembled rotatably with the main body 10.

The main body 10 consists essentially of a rectangular base enclosure 16 with an upper opening and a cover member 14 assembled with the enclosure 16 to cover the opening. An upper surface of the main body 10 is provided with a key board 18, a click switch 19, and a protrusion 23 at the rear end of the upper surface.

The display unit 12 includes a box-like housing 22 corresponding in shape to the main body 10, and a liquid crystal display panel 30 received in the housing 22. The display unit 12 further has leg portions 26 rotatably engaged with the protrusion 23 through a hinge (not shown) of the main body 10.

Figure 3:
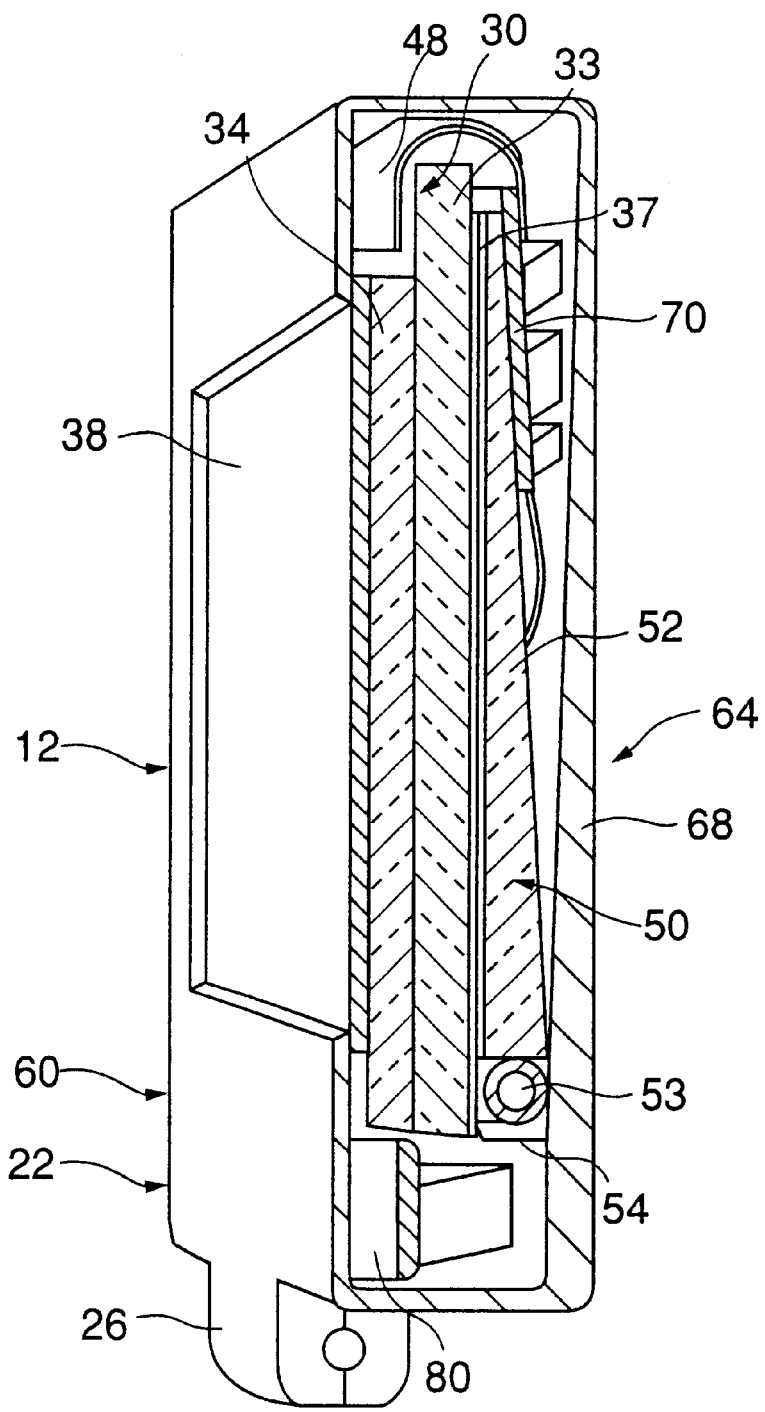
FIG. 3 is a sectional view of the personal computer taken along the line III-III'.
Figures 4, 5:
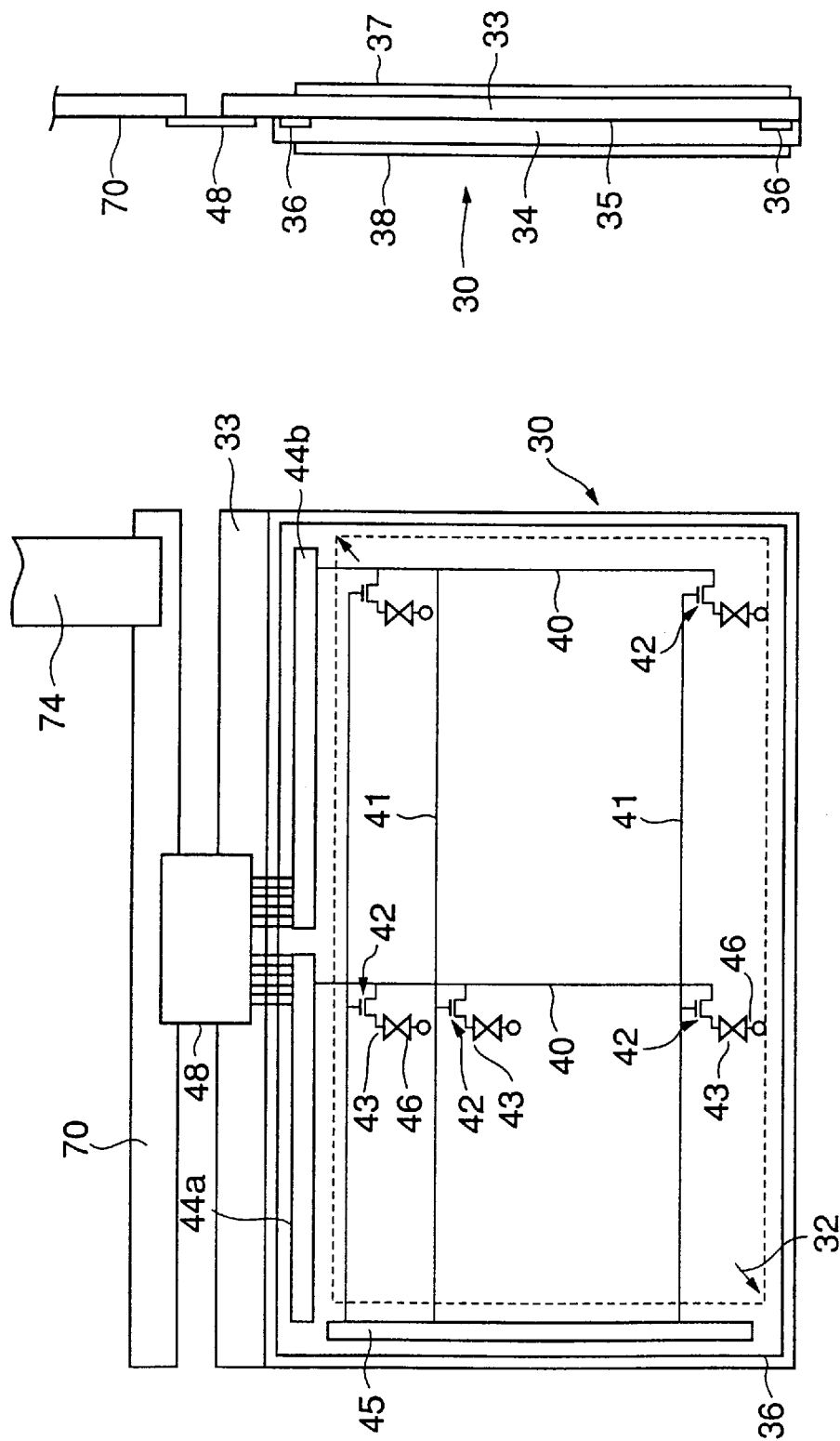
FIG. 4 is a schematic plan view of the flat panel display device shown in FIG. 1.
FIG. 5 is a side view of the flat panel display device shown in FIG. 1.

With this structure, the display unit 12 is rotatable between its closed position (as shown in FIG. 1) to cover the upper surface of the main body 10 and its opened position (as shown in FIG. 3) for an operator to operate the key board 18 and to watch the liquid crystal display panel 30.

Figure 2:
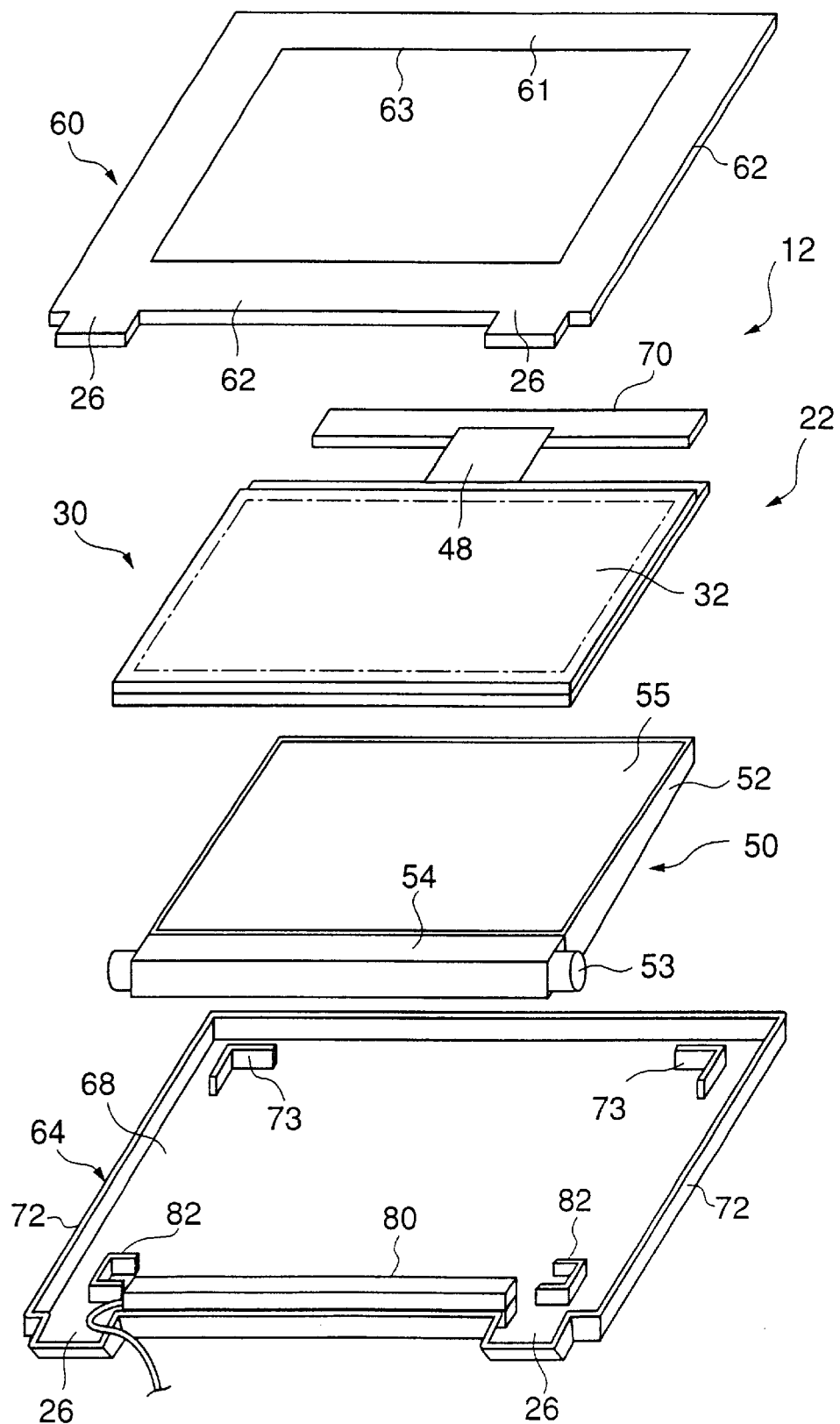
FIG. 2 is a side view of disassembled components of the flat panel display device shown in FIG. 1.

Next, the display unit 12 functioning as a flat panel display device will be described below in detail. As shown in FIGS. 1 through 3, the display unit 12 is assembled from the display panel 30, a surface light source unit 50, a control circuit board 70, an inverter circuit board 80, and a display housing 22. The display panel 30 is, for instance, a light transmission type color liquid crystal display device which has an effective display region 32 with a 12.1' diagonal length. The surface light source unit 50 is disposed opposite to the inner surface of the liquid crystal display panel 30. The control circuit board 70 is connected to the display panel 30 through a flexible printed circuit board 48 to control the liquid crystal display panel 30. The inverter circuit board 80 supplies the light source unit 50 with a driving voltage. The housing 22 receives those components as assembled.

As shown in FIGS. 2 through 5, the display panel 30 includes circuit array and counter substrates 33 and 34 with a predetermined gap, and a twisted-numatic (TN) liquid crystal layer 35 held in the gap through alignment layers coated respectively on the substrates 33 and 34. The array and counter substrates 33 and 34 are sealed by sealant 36 at their edge portions. Polarizers 37 and 38 are attached to the outer surfaces of the substrates 33 and 34. The polarization axes of the polarizers 37 and 38 are disposed to cross substantially at a right angle.

The circuit array substrate 33 includes a glass sheet substrate on which 800×3 signal lines 40 and 600 scanning lines 41 are provided in matrix form to cross each other at a right angle. A thin film transistor (TFT) 42 is also disposed at the vicinity of each crossing point of the signal and scanning lines 40 and 41 on the glass substrate. The TFT 42 is provided with a channel region made of a poly-silicon semiconductor film, a gate electrode connected to the scanning line 41, a drain electrode connected to the signal line 40, and a source electrode connected to an indium tin oxide (ITO) pixel electrode 43.

Further, there are disposed on the glass substrates a pair of signal line driver circuits 44a and 44b connected to the signal lines 40 and a scanning line driver circuit 45 connected to the scanning lines 41. The circuits 44a, 44b and 45 are formed in the same process as the TFTs 42 and are integrated on the glass sheet.

The signal line driver circuits 44a and 44b each are provided, thought not shown, with a shift register, a digital-analog conversion circuit, and a buffer circuit. A serial digital image signal supplied from other circuits in the main body 10 is converted to a parallel analog signal through the signal line driver circuits 44a and 44b. The scanning line driver circuit 45 includes a shift register and a buffer circuit. The scanning line driver circuit 45 outputs a scanning signal in response to a control signal supplied from the other circuits in the main body 10.

The counter substrate 34, on the other hand, includes a sheet glass substrate on which a color filter layer (not shown) and an ITO counter electrode 46 are disposed.

The liquid crystal display panel 30 is connected to the control circuit board 70 through the flexible printed circuit board 48. The control circuit board 70 is connected to the main body 10 through a flexible printed circuit board 74. The control circuit board 70 generates the digital image signal provided with timing signals, data arranging order and so on in accordance with an original digital image signal, a system clock signal and reference voltages transmitted from the main body 10. In order to drive the liquid crystal display panel 30, the control circuit board 70 also generates the control signals composed of horizontal and vertical clock signals, horizontal and vertical start signals, an enabling signal and so on. The control circuit board 70 further includes voltage converters to supply various driving voltages to the liquid crystal display panel 30. The voltage converters generate gate pulses with off-level and on-level voltages of −10 V and +2 V for gate drive circuits, respectively, and reference voltages from 0 V to 6 V for digital-to-analog conversion of signal driver circuits.

As shown in FIGS. 2 and 3, the surface light source unit 50 is provided with a rectangular light guide plate 52, a tube-like light source 53, a reflector 54, and optical films 55 and 56. The light guide plate 52 is wedge-like in sectional view so that the plate 52 is gradually thinner in thickness from one thick side end to the opposite end. The tube-like light source 53 is disposed along, and opposite to, the thick side end of the light guide plate 52. The reflector 54 is disposed along the tube-like light to reflect light from the light source 53 to the light guide plate 52. The light source 53 is connected to the inverter circuit board 80 which is, in turn, connected to the main body 10 in the same fashion as the control circuit board 70. The optical film 55 is put on the light outgoing surface of the light source unit 50 and the brightness uniformity thereof. The optical film 56 is put on the counter surface opposite to the outgoing surface to reflect incident light to the latter.

The liquid crystal display panel 30, the surface light source unit 50, the control circuit board 70 and inverter circuit board 80 are assembled with the display housing 22. As shown in FIGS. 2 through 6, the housing 22 is composed of a surface cover member 60 and a base enclosure 64. The surface cover member 60 and the base enclosure 64 are engaged with each other at their edge portions to make the housing 22 a flat surface and rectangular in shape.

The surface cover member 60 is made of a main frame 61 provided with a flat and approximately rectangular surface, upright side walls 62 at its edges and the leg portions 26. The main frame 61 has a window 63 corresponding, in shape and size, to the effective display region 32.

The base enclosure 64 has a flat rectangular bottom plate 68 and upright side walls 72 at its edges. Capital letter L-like and C-like protrusions 73 and 82 are provided to position the surface light source unit 50 as integrated. The bottom plate 68 is gradually thinner in thickness from the leg portions 26 to its opposite end.

The surface cover member 60 and the base enclosure 64 are made of a metal sheet, e.g., a 0.5 mm thick stainless steel plate, and an about 1 mm thick magnesium alloy plate to be easily processed, respectively. The liquid crystal display panel 30 is assembled with the surface light source unit 50. The control circuit board 70 connected to the display panel 30 through the flexible printed circuit board 48 is folded around the upper end portion of the surface light source unit 50. The light guide 52 of the surface light source unit 50 is fixed in the protrusions 73 on the base enclosure 64 so that the thicker and thinner portions of the light guide 52 are disposed on the side of the leg portions 26 and the opposite side thereof, i.e., the upper end portion of the base enclosure 64, respectively. The board 70 is disposed between the upper portion of the light source unit 50 and the bottom plate 68.

At the same time, the both end portions of the tube-like light source 53 and reflector 54 are fixed in the C-like protrusions 82 on the bottom plate of the base enclosure 64 so that those components are disposed close by the leg portions 26 and along the thicker end portion of the light guide plate 52. The inverter circuit board 80 is disposed close by the leg portion 26 in parallel with the tube-like light source 53 in the housing 22.

The surface cover member 60 is disposed on the display panel 30, the effective display region 32 of which is set by the window 63 of the surface cover member 60. Thus, the surface light source unit 50, the display panel 30, the control circuit board 70 and the inverter circuit board 80 are assembled and contained in the housing 22.

According to the personal computer described above, since the display panel 30 and the surface light source unit 50 are held between the surface cover member 60 and the base enclosure 64 in the display unit 12, neither the bezel nor the frame in a conventional display unit are needed. As a result, a sufficiently thin, light-weight display unit is produced so that the entire structure of a personal computer incorporated therewith can be thin in thickness and light in weight.

Moreover, relatively heavy-weight components, such as the tube-like light source 53, reflector 54, and the inverter circuit board 80, are disposed close by the leg portions 26 in the display unit 12. The thicker portions of the light guide plate 52 and the bottom plate 68 of the base enclosure 64 are also close to the leg portions 26. Therefore, the center of gravity of the display unit 12 is located on the side closer to the leg portions 26. When the display unit 12 rotates around the hinge, its rotation torque is significantly minimized while its durability associated with the rotation operation is remarkably improved.

The control circuit board 70, even when located at the top end portion of the display unit 12, is disposed between the upper, thinner portions of the light source unit 50 and the bottom plate 68 where a bigger gap is secured to receive it. The entire structure of a display unit can be made additionally thinner in thickness.

As different embodiments of this invention may be made without departing from the spirit and scope thereof, it is to be understood that the invention is not limited to its specific embodiments described herein. The center of gravity of a display unit, for instance, can be set in consideration of adjustment with respect to weight and relative positioning of components.

The TN mode liquid crystal display panel 30 is described by way of example but other light transmission type liquid crystal display units may be used. Although the active layer is made of poly-silicon to integrate the semiconductor circuits of the TFT 42, the signal line driver circuits 44a and 44b and the scanning line drive circuit 45, that of TFTs may be made of amorphous silicon and other components may be made independently as separate ones from and connected to the TFTs.

A part of or all the signal line and scanning line driver circuits may also be made in accordance with a chip-on-glass (COG) technology to make a driver IC chip on a substrate. Since, in this case, the driver circuit may be made on the substrate, the number of electric connections between the liquid crystal display unit and its outer circuits reduces substantially. The outer circuit and the display unit may be effectively made more compact in structure.

The control circuit board 70 and the inverter circuit board 80 to drive the tube-like light source 53 may be built in a circuit board in the main body instead of assembling the same in the display unit 12. Thus, the display unit may be made thinner in thickness and lighter in weight than the embodiment described above. A flat panel display device is applicable not only to a personal computer but also various other electronic equipment, such as handy terminal equipment.

As explained above, the present invention can provide a flat panel display device which is much thinner in thickness, lighter in weight, and better in durability.

What we claim is:

1. A flat panel display device, comprising:
    a flat display panel including a display region provided with a plurality of pixels;
    a circuit board to supply a driving signal to said flat display panel;
    a light source provided opposite to said flat display panel, said light source emitting light toward said flat display panel;
    a cover member including a window corresponding to said display region;
    an enclosure receiving said flat display panel, said circuit board, and said light source, said enclosure being assembled exclusively with said cover member; and
    a rotatable support member provided at one end portion of either said cover member or said enclosure, said rotatable support member rotatably supporting said cover member and said enclosure;
    wherein the center of gravity of said flat display panel is configured to be on one side of said one end portion.

2. The flat panel display device according to claim 1, wherein said center of gravity is set by adjusting a disposition and thickness of said light source and thickness of said enclosure.

3. The flat panel display device according to claim 1, wherein said light source includes:
    a tube-like light source disposed close to said support member;
    a light guide to convert light emitted from said tube-like light source to surface light;
    a reflector to reflect the light emitted from said tube-like light source to said light guide; and
    an optical film provided opposite to said light guide to make brightness of the surface light substantially uniform.

4. The flat panel display device according to claim 3, wherein said light source further includes a light source driving circuit provided to be adjacent to said tube-like light source.

5. The flat panel display device according to claim 3 or 4, wherein said light guide is gradually thinner in thickness from said one end portion of said enclosure to an opposite end portion thereof.

6. The flat panel display device according to claim 3 or 4, wherein said display panel is provided opposite to said light guide is gradually thinner in thickness from said one end portion of said enclosure to an opposite end portion thereof.

7. The flat panel display device according to claim 6, wherein said circuit board is connected to said display panel at said one end portion of said enclosure and is provided in a vicinity of said opposite end portion and is disposed between said light guide and said enclosure.

8. The flat panel display device according to claim 1, wherein said display panel includes a pair of oppositely disposed substrates and a liquid crystal layer held between said substrates, and said flat panel display device further includes a driving circuit integrated on at least one of said substrates to supply a signal to said pixels in response to the driving signal supplied from said circuit board.

9. The flat panel display device according to claim 8, wherein said light source includes a tube-like light source and light guide for converting light emitted from said tube-like light source to surface light, and said display panel is provided opposite to said light guide which is gradually thinner in thickness from said one end portion of said enclosure to an opposite end portion thereof.

* * * * *